ELECTRICAL CONTACT CARRIER STRIP

Filed Nov. 7, 1967 2 Sheets-Sheet 1

INVENTORS
FRANK JOHN FROMPOVICZ, DECEASED
BY MARY FROMPOVICZ, EXECUTRIX
WILLIAM RICHARD KNAPP
BY Martin L. Faigus
AGENT June 30, 1970 F. J. FROMPOVICZ ET AL 3,517,803
ELECTRICAL CONTACT CARRIER STRIP
Filed Nov. 7, 1967 2 Sheets-Sheet 2
FIG. 6
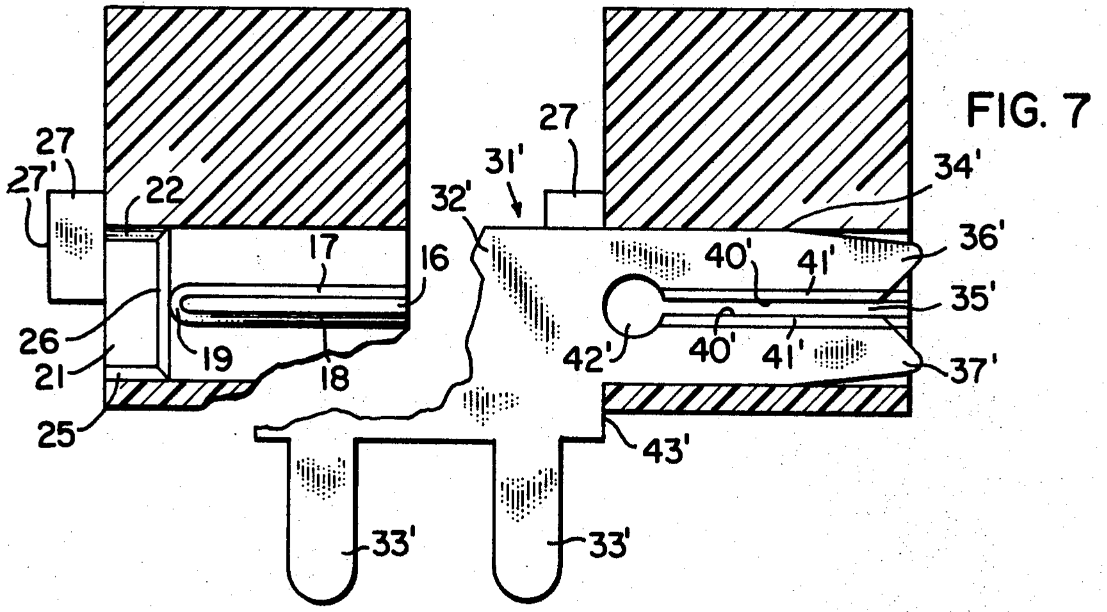
FIG. 7
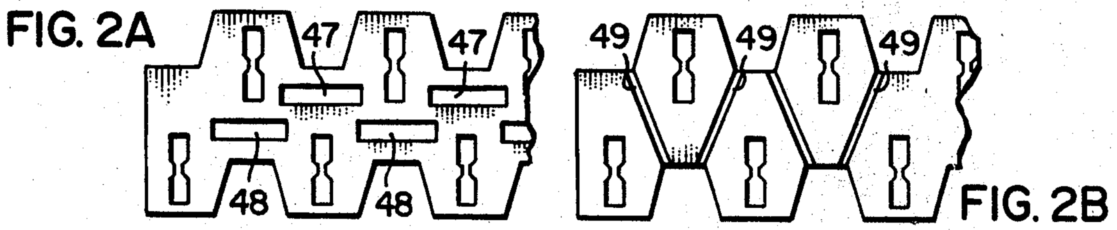
FIG. 2A, FIG. 2B
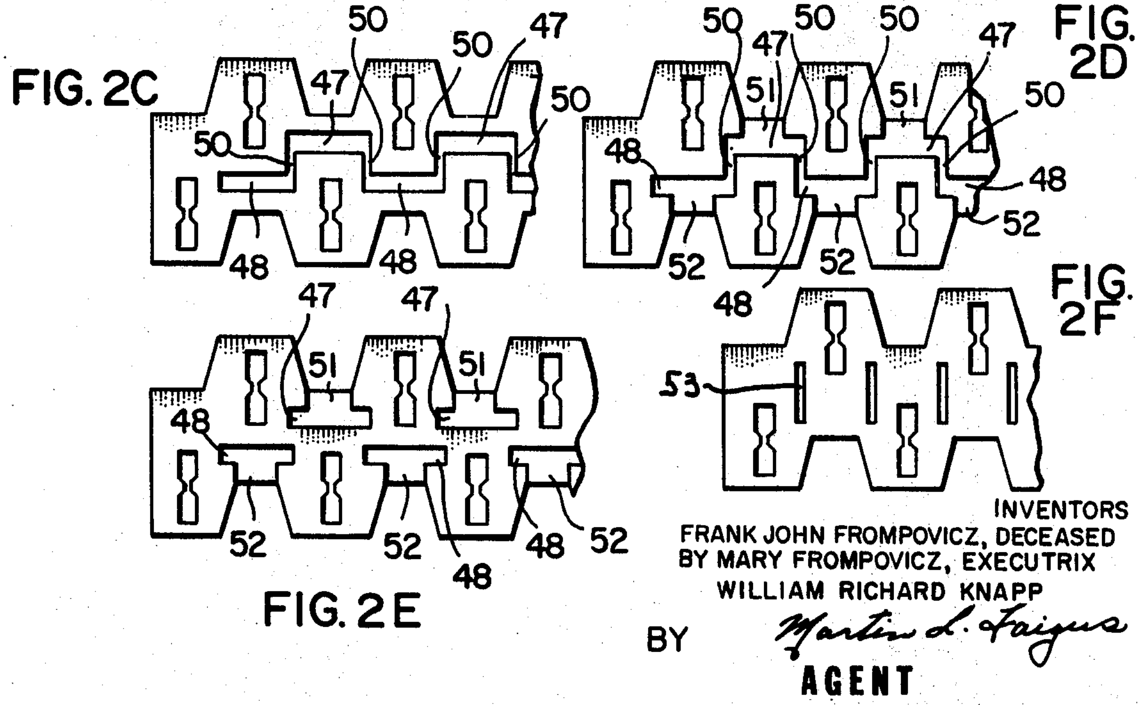
FIG. 2C, FIG. 2D, FIG. 2E, FIG. 2F
INVENTORS
FRANK JOHN FROMPOVICZ, DECEASED
BY MARY FROMPOVICZ, EXECUTRIX
WILLIAM RICHARD KNAPP
BY Martin L. Faigus
AGENT United States Patent Office 3,517,803
Patented June 30, 1970

3,517,803
ELECTRICAL CONTACT CARRIER STRIP

Frank John Frompovicz, deceased, late of Cornwells Heights, Pa., by Mary Frompovicz, executrix, Cornwells Heights, and William Richard Knapp, Huntingdon, Pa., assignors to Elco Corporation, Willow Grove, Pa., a corporation of Delaware Filed Nov. 7, 1967, Ser. No. 681,312
Int. Cl. B65d *83/00;* H01r *13/28*
U.S. Cl. 206—56 12 Claims

ABSTRACT OF THE DISCLOSURE

An elongated, flexible, thermoplastic carrier strip is comprised of a plurality of openings arranged in a predetermined pattern for frictionally receiving and supporting the nose sections of a plurality of electrical contacts, each nose section having surface means, at least a portion of which constitutes contact engaging surface means, and each opening comprising means for engaging with at least part of said surface means of a nose section to aid in the proper alignment and engagement of said nose section within its respective opening, said strip further comprising recess means for relieving a concentration of compressive forces which are created within said strip by the frictional engagement between the nose sections of the contacts and the openings in the strip.

This invention relates to elongated, flexible, thermoplastic carrier strips for supporting, in a predetermined orientation, a plurality of electrical contacts. It is well known to secure a plurality of contacts on a printed circuit board to provide means whereby the printed circuit board can be attached to other electrical components or circuitry in electronic apparatus.

As one can well imagine, it would be a tedious and time-consuming operation to individually mount each contact, one-at-a-time, into a suitable opening in a printed circuit board.

An assembly of contacts has been developed by Herbert E. Ruehlemann, Pat. No. 3,182,276, by which the contacts can be handled in multiple arrays and assembled in such arrays with printed circuit boards. The Ruehlemann contact assembly consists of a thermosetting backing strip which is heated to a temperature at which it becomes softened to permit easy penetration of a portion of a tail section of a contact therein. The contacts, by the application of pressure, are then forced into the softened backing strip which hardens upon cooling to firmly hold such contacts to said strip. This assembly has several deficiencies which the present invention overcomes. The application of both heat and pressure is necessary to construct the contact assembly taught by the Ruehlemann patent, which requires two separate steps in the assembly process. Furthermore, in the Ruehlemann assembly, the nose sections of the contacts are unprotected and subject to being damaged during handling of the assembly. Also, in affixing two tiers of contacts (such as those shown in Pat. No. 2,994,056) to a printed circuit board it has been the practice commercially to mount each tier of contacts on a separate backing strip because of difficulties encountered in accurately mounting both tiers of contacts to the thermosetting backing strip disclosed by Ruehlemann. Therefore, two separate assembly operations must be performed to affix the two tiers of contacts to the printed circuit board.

The present invention is comprised of an elongated, flexible, thermoplastic carrier strip with openings therein for frictionally receiving the nose, or mating, portions of a plurality of contacts in a predetermined orientation. The contacts of the present invention are assembled with the strip by the application of pressure alone, i.e., one assembly step, thus simplifying the manufacturing of the assembly. Since the nose portion of the contacts are embedded in the strip, they are less susceptible to being damaged during handling of the assembly than are the nose sections of the contacts which are mounted on a thermosetting backing strip as taught by the Ruehlemann patent. Also, by providing openings in the strip for accommodating the nose sections of the contacts a strip of great versatility is provided. The strip of the present invention can be constructed with two parallel rows of openings, one row for accommodating a lower tier of contacts and the other row for accommodating an upper tier of contacts. In commercial practice, it has been found that both the upper tier and the lower tier contacts can be mounted on the single backing strip of this invention, and therefore, only a single assembly operation is required to mount both tiers of contacts to a printed circuit board.

The elongated, flexible, carrier strip of the present invention is further provided with relief recesses to prevent bowing of the strip due to the concentration of compressive forces along the width of the strip in the region of frictional engagement between the contact nose sections and the openings of said strip. Each opening is provided with aligned projections therein to aid in the alignment and frictional engagement of a nose section which is comprised of two legs with contact engaging surfaces; the projections being in frictional engagement with the contact engaging surfaces of said nose section in the preferred embodiment of the invention.

The advantages of this invention along with other details of construction will become readily apparent as the same becomes better understood in view of the following detailed description of the invention, and the accompanying drawings, wherein:

FIG. 1 is a front view of the elongated flexible carrier strip of this invention.

FIGS. 2A–F show several different embodiments of the rear portion of the carrier strip, each view showing relief recesses of a different configuration to relieve against bowing of the strip as a result of compressive forces set-up in the strip in the region of frictional engagement between the nose sections of the contacts and the openings of the strip.

FIG. 6 is a side view through 6—6 of FIG. 1.

FIG. 7 is a view similar to FIG. 6 with a lower tier contact assembled in the strip.

Figure 1:
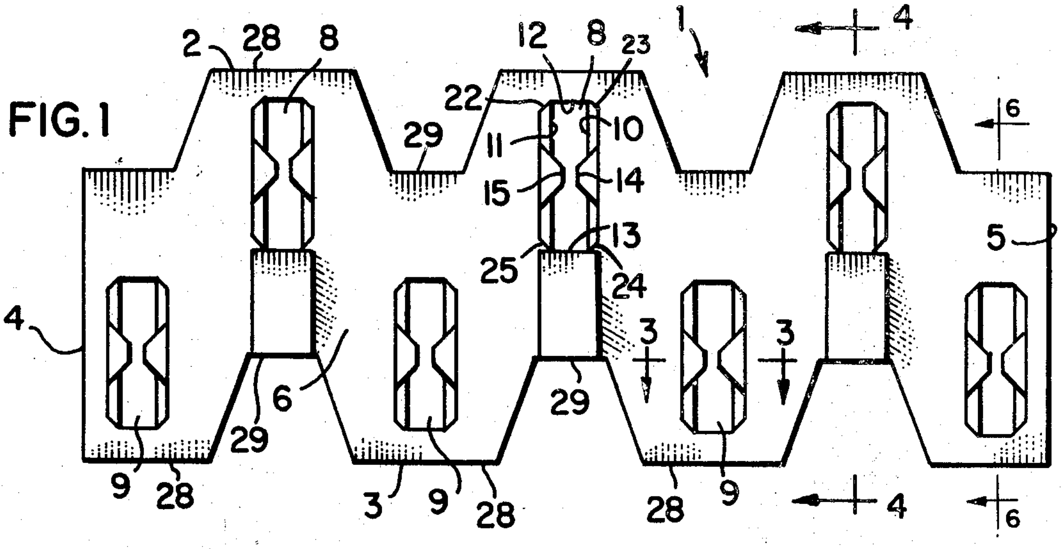
Figure 4:
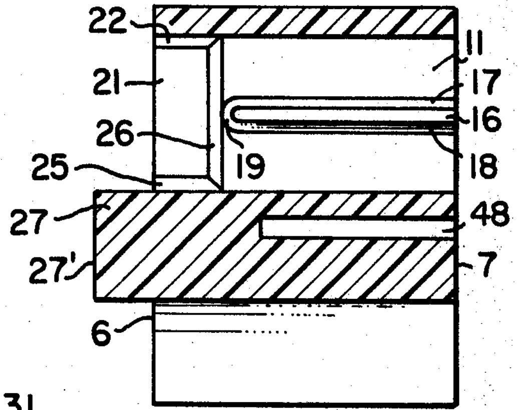
FIG. 4 shows a sectional view of the carrier strip through 4—4 of FIG. 1.
Figure 5:
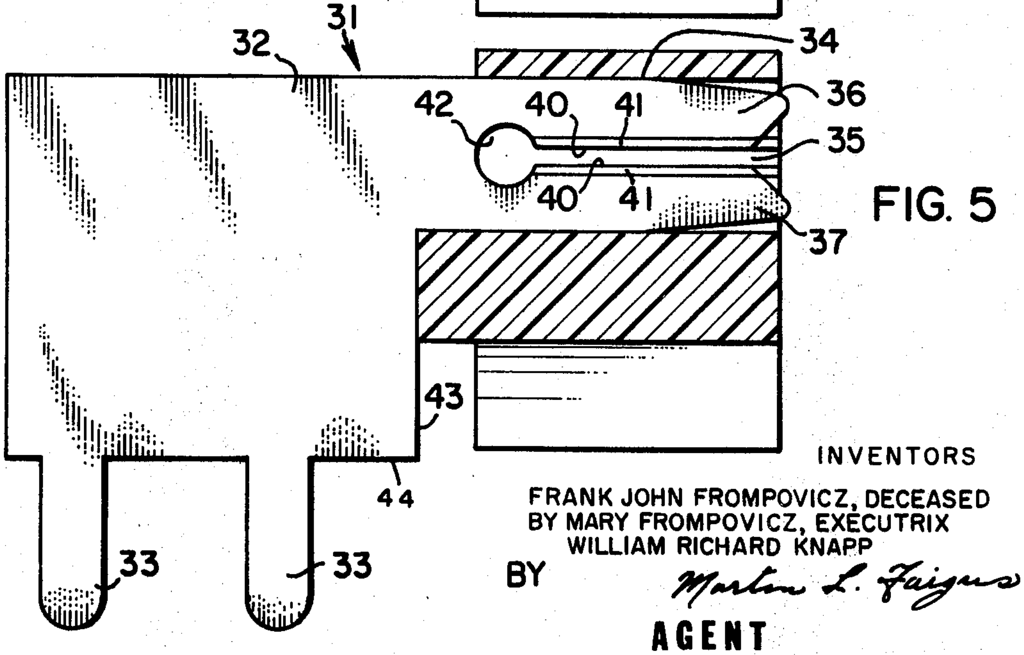
FIG. 5 is a view similar to FIG. 4 with an upper tier contact assembled in the strip.

An elongated, flexible, thermoplastic carrier strip 1 (FIG. 1) is provided for supporting a plurality of electrical contacts 31, 31' (FIGS. 5 and 7). The carrier strip 1 has a first group of spaced openings 8 for receiving and supporting bifurcated nose sections 34 (FIG. 5) of a first group of contacts 31, and a second group of spaced openings 9 for receiving and supporting bifurcated nose sections 34' of a second group of contacts 31' (FIG. 7). The carrier strip 1 has a longitudinal dimension defined by end surfaces 4 and 5, a transverse dimension defined by upper surface 2 and lower surface 3, and a width, or thickness, defined by front planar surface 6 and rear planar surface 7 (FIGS. 1 and 4). The upper and lower surfaces 2 and 3 have a corrugated configuration comprised of alternate ridges 28 and valleys 29. The ridges 28 of the upper surface 2 are in transverse alignment with the valleys of the lower surface 3. Stating this another way, the ridges of the upper surface are staggered in a longitudinal direction with respect to ridges of the lower surface, and the valleys of the upper surface are staggered in a longitudinal direction with respect to the valleys of the lower surface.

Figure 3:
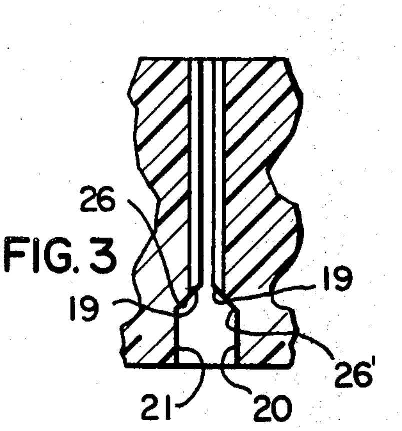
FIG. 3 shows a sectional view of the carrier strip through 3—3 of FIG. 1.

The openings 8 and 9 for receiving and supporting the bifurcated nose sections 34 and 34' of electrical contacts 31 and 31', respectively, all have the same general configuration; therefore, the discussion which follows will be limited to a description of one of said openings. Referring to FIG. 1, each opening is defined by upper and lower walls 12, 13, and, in part, by a first pair of side walls 10 and 11 (FIGS. 1 and 4). A pair of projections 14 and 15 (FIG. 1) project into each of said openings from each side wall 10 and 11 and are in longitudinal alignment. Each projection, in the preferred embodiment of this invention, extends from the rear planar surface 7 toward front planar surface 6 and has a length in the width-wise direction of the strip greater than one half of the width of the strip 1. It is contemplated that the projections can assume many different forms. For example, such projections could constitute projections of a nominal width which would be sufficient to engage with surfaces of a nose section of a contact. Also, the projections need not extend to the rear surface of the strip but could terminate at a point short of said rear surface. Also, the strip need not extend in the width-wise direction for a distance greater than one half the width of the strip, although it is believed that by extending the projection for a width greater than one half the width of the strip, the bowing of the strip due to concentration of compressive forces between the nose section of the contacts and the openings of the strip is minimized. Furthermore, the strip could be utilized without any projections whatsoever, the friction fit between the nose sections of the contacts and the openings being effected solely by contact between the outer surfaces of the nose sections and the walls defining each opening. In the preferred embodiment projection 15 has a flat front surface 16 (FIG. 4) and chamfered side surfaces 17 and 18 which terminate at side wall 11 of the opening. Projection 14 has the same configuration as projection 15 and has chamfered surfaces which terminate at side wall 10 of the opening. The projection 15 terminates in the width-wise direction of the strip in a chamfered end surface 19 (FIG. 4). Side wall 11 terminates at chamfered back section 26 (FIG. 4), and provides a connection between side wall 11 and side wall 21 (FIG. 4). Side wall 10 terminates in a chamfered back section 26' (FIG. 3), said back section providing a connection between side wall 10 and side wall 20. The edges defined by side walls 20 and 21 and upper and lower walls 12 and 13 are also chamfered at 22, 23, 24, and 25 as is shown in FIGS. 1 and 4. The distance between side walls 20 and 21 of each opening is greater than the distance between side walls 10 and 11 (which are the confining surfaces for the nose sections) and therefore facilitates the insertion of the contacts into the openings from the front of the carrier strip 1.

A plurality of abutment means 27 are disposed longitudinally along the front planar surface of the carrier strip and project outwardly therefrom. Each abutment means is in transverse alignment with an opening 8 and is provided with an abutment surface 27' (FIG. 6) for engaging with the front surface 43 of the flat body section 32 of a contact 31 (FIG. 5) when said contact is properly positioned within the opening 8, thus aiding in the positioning of the contact within said opening. It is to be understood that the particular dimensions of the abutment means will be determined by the particular contacts which are utilized. It is further contemplated that the carrier strip could be utilized without any abutment means when the shape of the contacts so dictate.

In the particular embodiment disclosed, contact 31 (FIG. 5) is provided with a flat body section 32 which has a lower surface 44 from which legs 33 laterally extend.

The body section is further comprised of front surface 43 which abuts with abutment surface 27' (FIG. 6) of abutment means 27 when the contact is properly positioned within an opening in the carrier strip 1. The legs 33 are adapted to be inserted into openings in a printed circuit board and attached to the board by any suitable method, such as staking. The contact is further comprised of a bifurcated nose section 34 having contact legs 36 and 37 separated at their inner edges 40 by a slot or space 35. Slot 35 terminates in an enlarged opening 42 which enhances the spring characteristics of the contact legs 36, 37. Portions of the inner edges 40 of the contact legs are chamfered (e.g., 41 to provide flat contact surfaces which will mate with flat contact surfaces of a similar contact which has its legs disposed in a plane which is 90 degrees with respect to the plane of the legs of contact 31. The chamfered surfaces 41 of the inner edges 40 of contact 31 mate with the chamfered side surfaces 17 and 18 of projections 14 and 15 when the nose section of the contact is inserted in an opening 8. Thus, the projection serves to properly align the contact nose section within the opening and to frictionally engage with the chamfered surfaces of the contact legs to aid in aligning and supporting the legs of the contacts in the openings.

Each contact 31' (FIG. 7) which is received in openings 9 of carrier strip 1 has a nose section 34' which is the same as nose section 34 of contact 31. The body section 32' of each contact 31' has a greater longitudinal dimension but a lesser transverse dimension than body section 32 of contact 31. Contacts 31' are inserted into openings 9 until front surfaces 43' of the body sections 32' abut against the front planar surface 6 of the carrier strip. By utilizing the abutment means 27 in conjunction with each contact 31 the back surfaces of each of said contacts 31 will be in lateral alignment with the back surfaces of each of the contacts 31' when the contacts are assembled in the carrier strip 1. In the assembled arrangement, each leg of the contacts will be in longitudinal alignment with the respective legs of a corresponding contact but offset in the width-wise direction of the strip from every other leg of the contacts. Thus in the assembled relationship, the legs of the contacts will be disposed in four parallel longitudinal rows. This arrangement of the legs facilitates the automatic assembly of the contacts into a printed circuit board, and the staking of the legs to such board.

An inherent problem encountered in utilizing the carrier strip described thus far, is the bowing of the strip which occurs due to uneven distribution of compressive forces along the width of the carrier strip caused by the frictional engagement of the nose sections of the contacts with the openings 8 and 9. To further amplify, the friction fit among the nose sections of contacts 31, 31'; the side walls 10 and 11; and the chamfered side surfaces 17 and 18 of projections 14 and 15, set up compressive forces in the strip throughout the region of friction fit, which forces are of a greater magnitude than the compressive forces set up throughout the remainder of the width of the carrier strip. This uneven force distribution will cause the strip to bow, i.e., the rear planar surface 7 will assume a convex configuration and the front planar surface 6 will assume a concave configuration. It is desirable to reduce this bowing effect to a minimum because the strip must be in a straightened configuration prior to assembly and staking of the contacts in a printed circuit board. It is also desirable to provide a flexible strip which can be easily straightened to compensate for any bowing which may take place.

FIGS. 2A–F show several structural arrangements by which the bowing of the strip can be reduced, and the strip rendered quite flexible. The generic concept disclosed in all of the embodiments is to provide a plurality of relief recesses in the rear planar surface 7 of strip 1 which recesses extend at least partially through the strip in the width-wise direction and adjacent the regions wherein the greatest compressive forces will be encountered due to the friction fit between the openings 8 and 9 and the nose sections 34, 34′ of contacts 31, 31′.

FIG. 2A shows a first embodiment wherein recesses are disposed in two substantially parallel rows 47 and 48. The recesses of one of said rows 47 are spaced longitudinally along said strip and are adjacent the upper surface 2 of said strip. A substantial portion of each of the recesses in said one of said rows 47 is in transverse alignment with a corresponding valley 29 of said upper surface. The recesses in the other of said rows 48 are spaced longitudinally along said strip and are adjacent the lower surface 3 thereof. A substantial portion of each of said recesses in said other of said rows 48 is in transverse alignment with a corresponding valley 29 of said lower surface 3. A portion of each of the recesses in both of said rows extends in a longitudinal direction beyond the valley with respect to which it is transversely aligned such that part of each recess in one of said rows 47 overlap in a longitudinal direction with adjacent recesses in the other of said rows 48.

FIG. 2B discloses a second embodiment wherein recesses 49 extend through the upper and lower surface of the strip with each recess separating an upper opening from an adjacent lower opening.

FIG. 2C discloses a third embodiment which is similar to the embodiment of FIG. 2A. In this embodiment a third row of recesses 50 are provided which are spaced longitudinally along said strip. Each recess in said third row 50 extends transversally of said strip for interconnecting the recesses which are disposed as set forth in the embodiment of FIG. 2A. The interconnection is effected in the region of overlap between the recesses of the upper row 47 and the recesses of the lower row 48.

FIG. 2D discloses a fourth embodiment which includes all the recesses of the embodiment disclosed in FIG. 2C and in addition includes additional rows of recesses 51 and 52. The recesses of one of said additional rows 51 are spaced longitudinally along said strip, each recess of said one of said additional rows extend at least partially through said strip in a width-wise direction and extends in a transverse direction from and through a valley of the upper surface and through an upper wall 53 of a recess which was defined in FIG. 2A and which was adjacent an upper valley of said strip. The recesses of the other of said additional rows 52 are spaced longitudinally along the strip with each recess of said other of said additional rows extending at least partially through the strip in a width-wise direction. Such recesses extend in a transverse direction from and through a valley of the lower surface of the strip and through a lower wall 54 of a recess which was defined in the embodiment of FIG. 2A and which was aligned with a valley of the lower surface of said strip.

FIG. 2E discloses a fifth embodiment which includes the recesses described in the embodiment of FIG. 2A and the additional rows of recesses defined in the embodiment of FIGS. 2D. This embodiment differs from the embodiment disclosed in FIGS. 2D in that the particular recesses which were described in the embodiment of FIG. 2A are not interconnected in the region of overlap by a third row of recesses.

FIG. 2F discloses a sixth embodiment which comprises a row of recesses 53 which are spaced longitudinally along said strip with the longest dimension of each recess being in the transverse direction of the strip. Each recess is positioned between adjacent upper and lower openings.

A detailed description of the various forms of the invention has been set forth above to provide a full, clear, and concise disclosure of the invention of this application and is in no way intended to limit the scope of protection which applicants are entitled to.

What is claimed is:

1. An elongated, flexible carrier strip for supporting a plurality of contacts, each contact having a nose section with surface means, at least a portion of which constitutes contact engaging surface means said strip comprising:

(a) a plurality of openings arranged in a predetermined pattern for receiving the nose sections of the contacts; and (b) means associated with each of said openings for frictionally engaging at least part of said contact engaging surface means of each nose section to aid in holding and properly aligning said contact with said strip.

2. The carrier strip of claim 1 wherein each nose section is comprised of a pair of contact legs having inner edges separated by a slot or space, said inner edges constituting said surface means, at least a portion of which constitutes said contact engaging surface means: each of said openings being defined by a pair of spaced side surfaces and said means for frictionally engaging at least part of said surface means comprising at least one projection extending into each of said openings from at least one side surface of said pair of side surfaces which define said opening.

3. The carrier strip of claim 1 having a longitudinal dimension defined by a pair of end surfaces, a transverse dimension defined by upper and lower surfaces, and a width defined by front and rear surfaces, said upper and lower surfaces each having a corrugated configuration comprised of alternate ridges and valleys, said openings being arranged in two substantially parallel rows for frictionally receiving and supporting the nose sections of said contacts, the openings of one of said rows being spaced longitudinally along said strip and adjacent the upper surface thereof, each opening in said one of said rows being in transverse alignment with a ridge of said upper surface; the openings of the other of said rows being spaced longitudinally along said strip and adjacent the lower surface thereof, each opening in the other of said rows being in transverse alignment with a ridge of said lower surface.

4. The carrier strip of claim 2 having a longitudinal dimension defined by a pair of end surfaces, a transverse dimension defined by upper and lower surfaces, and a width defined by front and rear surfaces, said upper and lower surfaces each having a corrugated configuration comprised of alternate ridges and valleys, said openings being arranged in two substantially parallel rows for frictionally receiving and supporting the nose sections of said contacts, the openings of one of said rows being spaced longitudinally along said strip and adjacent the upper surface thereof, each opening in said one of said rows being in transverse alignment with a ridge of said upper surface; the openings in the other of said rows being spaced longitudinally along said strip and adjacent the lower surface thereof, each opening in the other of said rows being in transverse alignment with a ridge of said lower surface.

5. An elongated flexible carrier strip, the width of which is defined by front and rear planar surfaces, for supporting a plurality of contacts, each contact having a nose section with surface means, at least a portion of which constitutes contact engaging surface means, said strip comprising:

(a) a plurality of openings arranged in a predetermined pattern for frictionally receiving and supporting the nose sections of the contacts and thereby setting up a concentration of compressive forces in said strip in the region of engagement, and (b) recess means for relieving the strip from the concentration of compressive forces to prevent the front and rear surfaces from bowing.

6. The carrier strip of claim 5 further comprising means associated with each of said openings for frictionally engaging at least a part of said surface means of said nose sections to aid in frictionally holding and properly aligning said contacts with said strip.

7. The carrier strip of claim 6 further comprising a plurality of abutment means projecting from said front surface, each abutment means being adjacent an opening and having an abutment surface adapted to engage with a portion of a tail section of a contact when the contact is properly positioned within one of said openings thus aiding in the positioning of the contact within said one of said openings.

8. The carrier strip of claim 5 having a longitudinal dimension defined by a pair of end surfaces, a transverse dimension defined by upper and lower surfaces, and a width defined by front and rear surfaces, said upper and lower surfaces each having a corrugated configuration comprised of alternate ridges and valleys, said openings being arranged in two substantially parallel rows for frictionally receiving and supporting the nose sections of said contacts, the openings of one of said rows being spaced longitudinally along said strip and adjacent the upper surface thereof, each opening in said one of said rows being in transverse alignment with a ridge of said upper surface; the openings in the other of said rows being spaced longitudinally along said strip and adjacent the lower surface thereof, each opening in the other of said rows being in transverse alignment with a ridge of said lower surface.

9. The carrier strip of claim 8 wherein said recess means include a plurality of recesses extending at least partially through said carrier strip in the width-wise direction, said recesses being disposed in two substantially parallel rows, the recesses in one of said rows being spaced longitudinally along said strip and adjacent the upper surface thereof, at least a substantial portion of each recess in said one of said rows being in transverse alignment with a corresponding valley of said upper surface; the recesses in the other of said rows being spaced longitudinally along said strip and adjacent the lower surface thereof, at least a substantial portion of each recess in the other of said rows being in transverse alignment with a corresponding valley of said lower surface.

10. The carrier strip of claim 8 wherein said recess means include a plurality of recesses extending at least partially through said carrier strip in the width-wise direction, each of said plurality of recesses extending through said upper and lower surfaces of said strip, and separating an upper opening from an adjacent lower opening.

11. The carrier strip of claim 8 wherein said recess means include a plurality of recesses extending at least partially through said carrier strip in the width-wise direction, said recesses being spaced longitudinally along said strip between adjacent upper and lower openings, the longest dimension of each recess being in the transverse direction of the strip.

12. A carrier strip according to claim 1 in combination with contacts engaged in respective ones of said plurality of openings in said carrier strip so that at least part of said contact engaging surface means on the contacts is engaged with respective ones of said means associated with each of said openings.

References Cited

UNITED STATES PATENTS

| | | | |
|---|---|---|---|
| 2,823,789 | 2/1958 | Henning ___________ | 198—131 |
| 2,396,725 | 3/1946 | Thomas. | |
| 2,640,970 | 6/1953 | Falge et al. | |
| 2,688,123 | 8/1954 | Benham et al. | |
| 3,129,814 | 4/1964 | Cheh et al. | |
| 3,141,717 | 7/1964 | Olsson et al. | |
| 3,182,276 | 5/1965 | Ruehlemann. | |
| 3,215,975 | 11/1965 | Kinkaid. | |
| 3,339,719 | 9/1967 | Bush. | |

MARVIN A. CHAMPION, Primary Examiner

P. A. CLIFFORD, Assistant Examiner

U.S. Cl. X.R.

339—17, 59; 198—131